April 2, 1968

E. O. STONE 3,376,454

NUMERIC ELECTROLUMINESCENT DISPLAY DEVICE
UTILIZING STACKED DIGIT

Filed April 2, 1965

INVENTOR.
ELMER O. STONE

BY

ATTORNEY

April 2, 1968

E. O. STONE 3,376,454

NUMERIC ELECTROLUMINESCENT DISPLAY DEVICE
UTILIZING STACKED DIGIT

Filed April 2, 1965

INVENTOR.
ELMER O. STONE

BY
Robert E. Strauss
ATTORNEY

United States Patent Office 3,376,454
Patented Apr. 2, 1968

3,376,454
NUMERIC ELECTROLUMINESCENT DISPLAY
DEVICE UTILIZING STACKED DIGIT
Elmer O. Stone, Seneca Falls, N.Y., assignor to Sylvania
Electric Products Inc., a corporation of Delaware
Filed Apr. 2, 1965, Ser. No. 445,009
9 Claims. (Cl. 313—109.5)

ABSTRACT OF THE DISCLOSURE

A numeric display device comprised of stacked electrodes suitably insulated one from another and each formed to represent a particular digit. The stacked electrodes are mounted on one side of an electroluminescent layer which has applied to the other side of a transparent common electrode. Application of a potential between the common electrode and one of the digit electrodes will cause that particular digit to appear on the face of the device.

---

This invention relates generally to display devices and more particularly to electroluminescent display devices of the type used as numeric readout indicators.

Display devices of various kinds useful as numeric or alphanumeric readout indicators are known in the art. They are employed in many different types of equipment such as counting devices, data processing equipment, electronic testing apparatus, digital clocks, etc.

A readout device suitable for operation in any of the instances noted above should possess certain qualifications among which are the following: compactness, ruggedness, and good viewability over a wide viewing angle. It should be capable of functioning directly from an input signal without having to resort to switching or translating devices. It should possess a speed of operation consistent with the other operations of the equipment in which it is used. It should be of the type which will not give an inaccurate reading because of the failure of one part, and it should not be subject to catastrophic failure. It should be relatively inexpensive to manufacture, operate, and maintain and, preferably, should not be dependent upon a particular kind of atmosphere for operation. Also, while not among the most important qualifications, the digits presented by the device should be aesthetically pleasing and easy to read.

The major display devices in use today include the following types: segmented electroluminescent devices; cold-cathode, glow discharge devices; rear screen optical projectors; mechanical devices; incandescent segmented displays; and cathode ray tubes.

An examination of these presently used display devices shows that all of them are wanting in one or more of the above-mentioned qualifications.

The segmented electroluminescent device, for example, must use a switching matrix to convert decimal input signals to the proper output signals and feed them to the necessary segments. Also, the nature of a segmented display provides numerals that are rectangular in appearance and are, for some people, difficult to read.

The cold cathode, gas-filled glow discharge devices utilize stacked numerals in a glass envelope which is fragile and rather bulky. It is subject to catastrophic failure and, of course, the electrodes must be surrounded by a special atmosphere. In addition, it has a relatively narrow viewing angle because of parallax which comes from stacking electrodes.

The rear screen optical projection system is bulky, difficult to maintain, and among the most expensive of the displays.

The chief fault of mechanical counters is that they are relatively slow, because of inertia and friction, when compared with wholly electrical devices.

Cathode ray tubes are bulky, require a good deal of associated equipment, are expensive, and require an evacuated envelope.

Segmented displays utilizing incandescent lamps are subject to the same limitations as the EL display and, in addition, are subject to false readings if only one lamp should fail. For instance, if the middle "bar" or lamp of the display should unknowingly fail, an "8" would appear on the display as "0." Such mistaken readings could, in many instances, prove to be very costly.

It is, therefore, an object of this invention to improve numeric readout devices.

It is another object of the invention to improve the readability of electroluminescent displays.

Still another object of the invention is to enhance the ruggedness of such devices.

Yet another object of the invention is the provision of a display device that utilizes stacked symbols but does not suffer from parallax.

Other objects of the invention are to provide numeric readout displays that are compact, simple and inexpensive to manufacture, always give a correct reading, are fast in operation, are not subject to catastrophic failure, and need no special atmosphere for operation.

The above objects are carried out by the provision of a device for displaying illuminable, intelligence conveying, stacked symbols in a common plane. Briefly, this is accomplished in one aspect of the invention in a device comprised of at least one layer of an electroluminescent phosphor embedded dielectric material having on one side thereof a transparent common electrode. The opposite side of the layer has thereon a plurality of stacked electrodes each formed to provide one of the symbols and each insulated one from the other. When a potential is applied between the common electrode and a selected one of the symbol electrodes, an electroluminescent lamp is formed and that symbol will appear on the face of the device. Means is provided for selectively applying a potential between the common electrode and any one of the symbols.

This device provides many distinct advantages over the prior art and possesses all of the necessary qualifications noted above. Because it is a solid-state device, compactness and ruggedness are inherent qualities. In spite of the fact that it is a stacked display, the nature of the electroluminescent phosphor is such that all symbols are displayed in a common plane making the device a planar one with an inherent wide angle of viewability with no distortion from parallax. Because each intelligence conveying electrode exists as a complete entry, no switching matrix is needed if the input signal is in decimal form. (All decimal numeric readout displays need some form of translation or switching if the input signal is in the form of binary coded decimal information.)

It is wholly electronic in operation, and therefore its speed of operation will be consistent with the equipment in which it is employed. It is a completely integrated unit; i.e., its symbols are not built up from pieces as in segmented displays and, therefore, it cannot provide false readings because of the failure of one part. Because it utilies electroluminescence, it will not fail catastrophically since electroluminescent devices expire gradually with a decreasing light output as they age.

In addition, the device is relatively simple and economical to make since standard graphic arts techniques may apply the intelligence conveying electrodes and standard coating practices or vapor deposition techniques may apply the insulators. The device operates well in normal atmosphere and, since each intelligence conveying electrode is a separate entity, a wide range of aesthetically pleasing configurations is available.

For a better understanding of the present invention, together with other and further objects, advantages, and capabilities thereof, reference is made to the following disclosure and appended claims in connection with the accompanying drawings in which:

Figure 1:
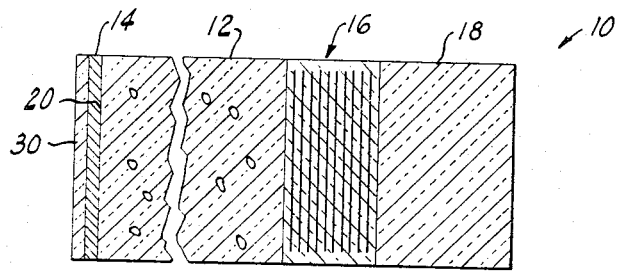
FIG. 1 is a side elevational sectional view of a device illustrating one embodiment of the invention.

Referring now to the drawings with greater particularity, in FIG. 1 there is illustrated a device 10 for displaying illuminable, intelligence conveying, stacked symbols in a common plane. Device 10 is comprised of a layer of an electroluminescent phosphor embedded dielectric material 12 having, on one side thereof, a transparent conductive coating 14 and on the opposite side thereof a plurality of stacked electrodes, indicated generally as 16, each formed to provide an intelligence conveying symbol and each insulated one from the other by insulating means 17. In this instance these symbols shall correspond to the arabic digits 1, 2 . . . 0; and they are so numbered. It is to be noted that this is by way of example only since symbols other than those mentioned are operable with this device, e.g., letters of the alphabet, and the number of electrodes may be more or less than ten. Also, it will be noted that the digits are not necessarily arranged in numerical order, see FIGS. 2 and 3. This is done to reduce the effect known as "shadowing" as will be explained hereinafter.

The dielectric material of layer 12 may be ceramic or plastic, both of which are currently used in electroluminescent devices; and the phosphor may be any one of a number of known varieties which luminesce when placed in an electric field. The entire array of coating 14, layer 12, and electrodes 16 may be mounted upon an insulating substrate 18 of some suitable material such as glass.

This construction provides an electroluminescent lamp which will luminesce when an electric field is placed across the common electrode 14 and any one of the digit electrodes. The area of luminescence will be in the same configuration as the digit energized and this configuration will appear on common plane surface 20. By switching the electric field to another digit electrode, that digit will be displayed.

Because the light output of an electroluminescent device is dependent upon many factors, including primarily the thickness of the dielectric, the strength of the electric field applied, and the frequency of the applied field, it follows that if the frequency and strength of the applied field remain constant, the light output will decrease as the thickness increases.

Therefore, since there must of necessity be some increase in thickness between the first digit electrode "3" and the last digit "1," relative to common electrode 14, (see FIG. 2) it follows that, with a constant voltage, the "1" will not be as bright as the "3."

This difference in brightness may be minimized, however, to the point where it is virtually undiscernible by keeping the total thickness of the digit electrodes and insulation small relative to the thickness of the phosphor dielectric layer.

For example, if layer 12 be 100 units thick and each of the individual digit electrodes and its associated insulator is one-tenth unit of thickness (when there are 10 digits) then the total difference between common electrode 14 and the first digit in the stack and the last digit in the stack is 1%.

Figure 4:
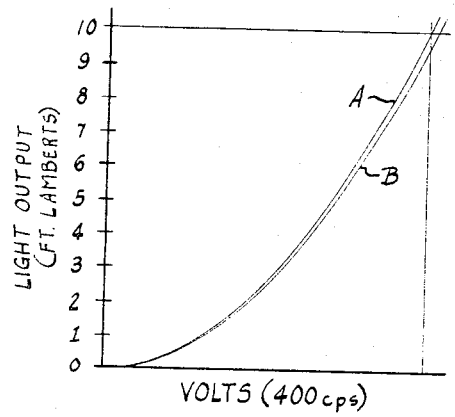
FIG. 4 is a graph of light output versus voltage for the device of FIG. 1.

The insignificant amount of decrease in light output under these circumstances is shown graphically in FIG. 4 where curve A represents the light output at a given voltage for the first digit in the stack and curve B represents the light output at the same voltage for the last digit in the stack. The light ouput for any digit between the first and the last would therefore fall between A and B.

The graph shown in FIG. 4 represents a typical decrease in light output and it is to be noted that this decrease would not necessarily be the same for all types of displays since they would be subject to variations due to the type of dielectric, type of phosphor, particle size of the phosphor, frequency of the applied field, manufacturing techniques, etc.

The small thickness required for the digit electrodes may be supplied by using photographic techniques or vapor deposition techniques. Any suitable electrically conductive material, such as aluminum, may be used. The insulation could be thin layers of mica or Mylar® film or it too could be applied by a coating process.

Figure 2:
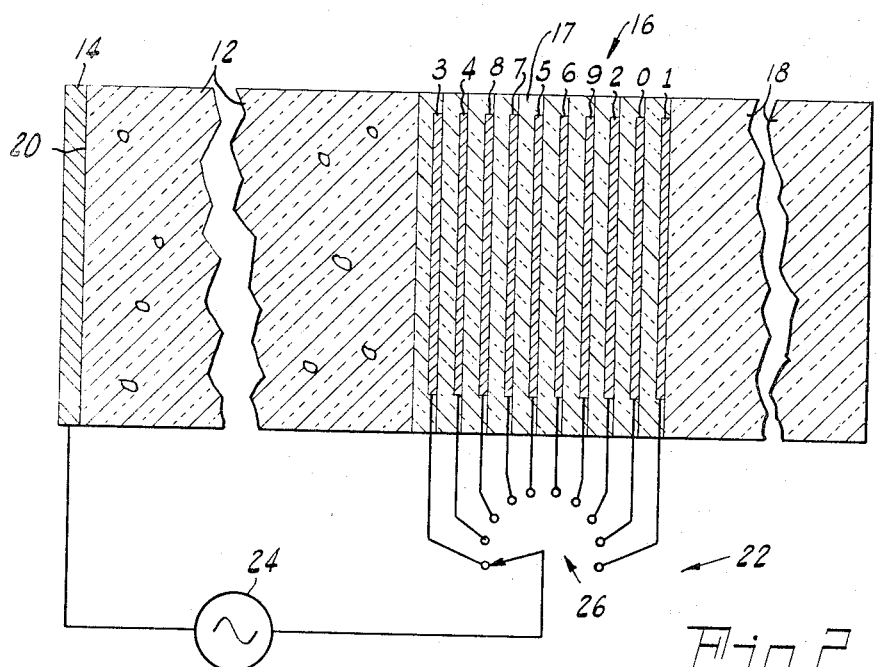
FIG. 2 is an enlarged side elevational sectional view of portions of the device of FIG. 1.

Voltage supply means 22 is shown diagrammatically in FIG. 2 as comprising an alternating current source 24 and digit selecting switch means 26. This switch would be provided with a position for each digit and it would ordinarily be operated by the equipment with which the display device is being utilized.

In operation the device performs as follows:

A coded energizing signal originating in associated equipment (not shown) will, by means of its coded information, actuate switch means 26 in accordance therewith and apply an electric field between the common electrode 14 and the selected digit electrode, for example "3."

This action will cause the "3" to appear on common plane surface 20. When a different energizing signal is sent from the associated equipment, switch 26 will move to a new position and the digit associated therewith will appear on surface 20.

Figure 5:
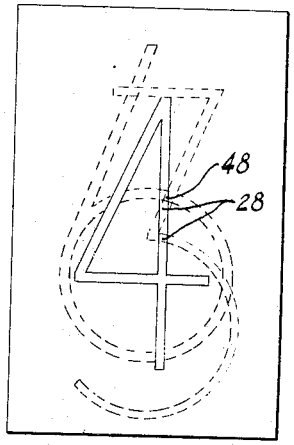
FIG. 5 is an elevational view of the device with a digit displayed.

The nonenergized digits lying between the common electrode and an energized or illuminated digit will have one of two different effects upon the illuminated digit depending on the potential at which they are maintained. If they are maintained electrically floating, they will luminesce to some degree by virtue of the voltage being impressed around them. Obviously, this effect becomes more distracting as the number of intermediate electrodes increases. If, on the other hand, these nonilluminated digits would be maintained at ground potential then an effect known as shadowing would occur. This shadowing is caused by the fact that no light will be produced between the common electrode and a nonilluminated electrode (maintained at ground potential) at those points where the nonilluminated electrode crosses or shadows an illuminated one. This is shown in FIG. 5 where the numeral "four" is displayed and is shadowed by the "three" which lies between it and the common electrode 14. No light will be produced in layer 12 at those areas indicated as 28 where the "three" shadows the "four."

Figure 3:
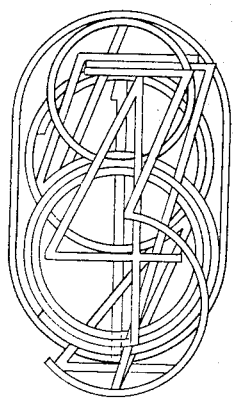
FIG. 3 is an elevational view showing one manner in which the electrodes may be stacked to reduce shadowing effects.

Various means may be used to minimize shadowing and one typical example is shown in FIG. 3. Here the digits are of varying sizes and they are staggered along their vertical axes. This prevents, for example, the curved lower portion of the "3," "5," "6," and "8" from being aligned. If these portions were aligned the digit closest to the common electrode 14 would completely shadow the similar portion of those behind.

Figure 6:
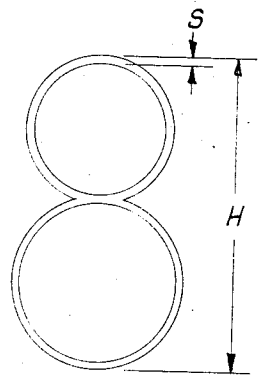
FIG. 6 is an elevational view of a digit that may be utilized with the device.

A further reduction in shadowing may be obtained by keeping the stroke "S," i.e., line width, of the digits small relative to the height "H" as shown in FIG. 6. A stroke equal to or less than 1/25 the height provides acceptable results and strokes as wide as 1/10 the height may also be used in some instances.

An apparent reduction in shadowing might also be accomplished by incorporating a light diffuser into the device. This might be a slightly frosted glass or translucent coating such as is indicated at 30 in FIG. 1. Such a device would have the effect of diffusing or spreading out the light of the displayed digit and would tend to fill in areas of no illumination caused by shadowing.

Figure 7:
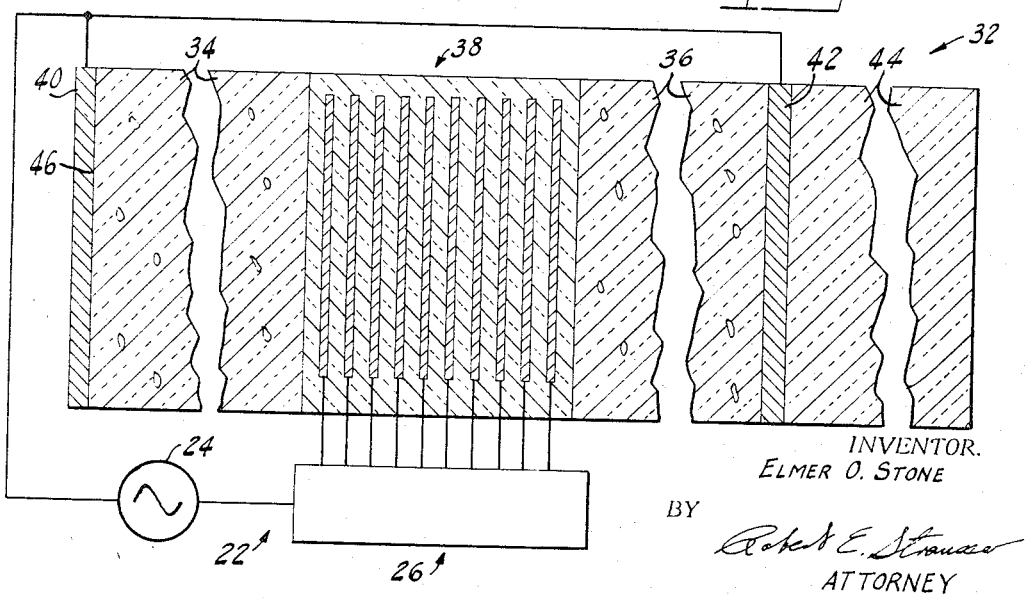
FIG. 7 is a side elevational sectional view of a device illustrating another embodiment of the invention.

An alternate embodiment of the invention is shown in FIG. 7. Device 32 is comprised of first and second layers of electro-luminescent phosphor embedded dielectric layers 34 and 36, respectively. Sandwiched between the layers is a plurality of symbolically formed, substantially transparent electrodes 38 each insulated one from the other and stacked in a manner hereinbefore described. The outermost surfaces of layers 34 and 36 are provided with first and second common electrodes 40, 42, at least one of which is transparent, which are electrically connected together. The transparent common electrode and the transparent digit electrodes may be formed from any suitable material that has the required parameters of transparency and electrical conductivity, such as stannous chloride. This entire array of layers and electrodes may be mounted upon an insulating substrate 44 of some suitable material, such as glass. Voltage may be supplied by voltage supply means 22 as in device 10.

In this embodiment, when switch 26 is activated and supplies an electric field between a digit electrode, for example "4," and the first and second common electrodes, two electroluminescent lamps will be formed, one between the digit and common electrode 40 and the other between the digit and common electrode 42. Since a certain translucency exists in the layers 34, 36 some light which is produced in layer 36 will be transmitted through the device to appear on common plane surface 46. This action serves to reduce shadowing substantially in the following manner. By referring to FIG. 5 it will be seen that when the "4" is illuminated it is shadowed by the "3" at areas 28. No light will be produced in these areas within layer 34. However, no electrode lies behind the "4" at those areas where it is shadowed by the "3" except at 48. Light will therefore be produced in areas 28 within layer 36 and, since the aforementioned translucency exists in the layers, and the electrodes and their associated insulations are substantially transparent, this light produced in layer 36 will be transmitted through layer 34 to appear on common plane surface 46. At area 48 no light at all will be produced since at this point the "4" is shadowed from in front by the "3" and from the rear by the "6." Since some light intensity will obviously be lost by diffusion, these areas may not be quite as bright as the rest of the illuminated digit; however, the loss may be kept to a minimum by closely matching the index of refraction of the various layers, insulators, and digits.

This device provides an extremely compact and rugged unit with many advantages over the prior art. The use of two layers of electroluminescent phosphor embedded dielectric and the electrically connected common electrodes reduces shadowing to the point where it is no longer objectional and provides a device that has many uses in industry.

While there have been shown and described what are at present considered the preferred embodiments of the invention, it will be obvious to those skilled in the art that various changes and modifications may be made therein without departing from the scope of the invention as defined by the appended claims.

What is claimed is:

1. A device for displaying illuminable, intelligence conveying, stacked symbols in a common plane, said device comprising: a layer of an electroluminescent phosphor embedded dielectric material having on one side thereof a transparent common electrode and on the opposite side thereof a plurality of substantially transparent, stacked electrodes each formed to provide one of said symbols and each insulated one from the other.

2. A device for displaying illuminable, intelligence conveying, stacked symbols in a common plane, said device comprising: a layer of an electroluminescent phosphor embedded dielectric material having on one side thereof a transparent common electrode and on the opposite side thereof a plurality of substantially transparent, stacked electrodes each formed to provide one of said symbols and each insulated one from the other; and means for applying a potential between said common electrode and one of said symbol electrodes.

3. A device for displaying illuminable, intelligence conveying, stacked symbols in a common plane, said device comprising in serial array: a first transparent common electrode; a first layer of electroluminescent phosphor embedded dielectric material; a plurality of substantially transparent, stacked electrodes each formed to provide one of said symbols and each insulated one from the other, said insulators being substantially transparent; a second layer of electroluminescent phosphor embedded dielectric material; and a second common electrode electrically connected to said first common electrode.

4. A device for displaying illuminable, intelligence conveying, stacked symbols in a common plane, said device comprising in serial array: a first transparent common electrode; a first layer of electroluminescent phosphor embedded dielectric material; a plurality of substantially transparent, stacked electrodes each formed to provide one of said symbols and each insulated one from the other, said insulators being substantially transparent; a second layer of electroluminescent phosphor embedded dielectric material; a second common electrode electrically connected to said first common electrode; and means for applying a voltage between said common electrodes and a selected one of said hymbol electrodes.

5. A device for displaying illuminable, intelligence conveying, stacked symbols in a common plane, said device comprising: a layer of an electroluminescent phosphor embedded dielectric material having on one side thereof a transparent common electrode and on the opposite side thereof a plurality of substantially transparent, stacked electrodes each formed to provide one of said symbols and each insulated one from the other, said symbols having a given height and a given stroke, said stroke being relatively small compared to said height.

6. A device for displaying illuminable, intelligence conveying, stacked symbols in a common plane, said device comprising: a layer of an electroluminescent phosphor embedded dielectric material having on one side thereof a transparent common electrode and on the opposite side thereof a plurality of substantially transparent, stacked electrodes each formed to provide one of said symbols and each insulated one from the other, said symbols having a given height and a given stroke, said stroke being relatively small compared to said height and said symbols being arrayed to provide minimal shadowing effects.

7. A device for displaying illuminable, intelligence conveying, stacked symbols in a common plane, said device comprising: at least one layer of an electroluminescent phosphor embedded dielectric material having on one side thereof a transparent common electrode and on the opposite side thereof at least two substantially transparent, stacked electrodes each formed to provide one of said symbols and each insulated one from the other.

8. A device for displaying illuminable, intelligence conveying, stacked symbols in a common plane, said device comprising: at least one layer of an electroluminescent phosphor embedded dielectric material having on one side thereof a transparent common electrode and on the opposite side thereof at least two stacked electrodes each formed to provide one of said symbols and each insulated one from the other.

9. A device for displaying illuminable, intelligence conveying, stacked symbols in a common plane, said device comprising: at least one layer of an electroluminescent phosphor embedded dielectric material having on one side thereof a transparent common electrode and on the other side thereof at least two stacked electrodes each formed to provide one of said symbols and each insulated one from the other; means for illuminating one of said symbol electrodes; and means for substantially diffusing the illumination therefrom.

References Cited

UNITED STATES PATENTS

| | | | |
|---|---|---|---|
| 2,783,408 | 2/1957 | Williams et al. | 313—109 |
| 2,867,739 | 1/1959 | Michlin | 313—108 |
| 2,953,776 | 9/1960 | Blutman et al. | 313—108 |
| 3,258,629 | 6/1966 | Power | 313—109.5 |

JAMES W. LAWRENCE, *Primary Examiner.*

R. JUDD, *Assistant Examiner.*